(12) United States Patent
Flach et al.

(10) Patent No.: US 10,313,127 B1
(45) Date of Patent: Jun. 4, 2019

(54) METHOD AND SYSTEM FOR DETECTING AND ALERTING USERS OF DEVICE FINGERPRINTING ATTEMPTS

(71) Applicant: TRACKOFF, Inc., Baltimore, MD (US)

(72) Inventors: Ryan A Flach, Baltimore, MD (US); Chandler R Givens, Baltimore, MD (US)

(73) Assignee: TRACKOFF, INC., Baltimore, MD (US)

( * ) Notice: Subject to any disclaimer, the term of this patent is extended or adjusted under 35 U.S.C. 154(b) by 0 days.

(21) Appl. No.: 16/155,254

(22) Filed: Oct. 9, 2018

Related U.S. Application Data

(60) Provisional application No. 62/738,442, filed on Sep. 28, 2018.

(51) Int. Cl.
| H04L 29/06 | (2006.01) |
| H04L 9/32 | (2006.01) |
| G06F 21/56 | (2013.01) |
| G06F 21/32 | (2013.01) |
| G06F 17/18 | (2006.01) |

(52) U.S. Cl.
CPC ............ *H04L 9/3231* (2013.01); *G06F 17/18* (2013.01); *G06F 21/32* (2013.01); *G06F 21/566* (2013.01)

(58) Field of Classification Search
CPC ..................................................... H04L 9/3231
See application file for complete search history.

(56) References Cited

U.S. PATENT DOCUMENTS

| 9,294,442 | B1* | 3/2016 | Lian ........................ H04L 63/20 |
| 2009/0089869 | A1* | 4/2009 | Varghese ................ G06F 21/31 |
| | | | 726/7 |
| 2013/0139263 | A1* | 5/2013 | Beyah ................. H04L 63/1408 |
| | | | 726/23 |
| 2015/0254955 | A1* | 9/2015 | Fields .................... G08B 21/02 |
| | | | 705/4 |
| 2016/0180078 | A1* | 6/2016 | Chhabra ................. G06F 21/31 |
| | | | 726/19 |
| 2016/0294875 | A1* | 10/2016 | Lian ..................... G06F 9/45558 |
| 2017/0180256 | A1* | 6/2017 | Kamath ................ H04L 47/125 |

OTHER PUBLICATIONS

Poh, Norman, Josef Kittler, and Thirimachos Bourlai. "Improving biometric device interoperability by likelihood ratio-based quality dependent score normalization." 2007 First IEEE International Conference on Biometrics: Theory, Applications, and Systems. IEEE, 2007. (Year: 2007).*

* cited by examiner

*Primary Examiner* — Shawnchoy Rahman
(74) *Attorney, Agent, or Firm* — Mark L Maki; Miller Canfield Paddock and Stone

(57) ABSTRACT

A method for detecting attempts to collect parameters used for device fingerprinting includes receiving information traversing a communications network and creating a dataset of examinable information. The dataset is then analyzed using a weighted scoring system to determine the probability that parameters present are intended for purposes of device fingerprinting and a score reflecting the same is returned.

17 Claims, 5 Drawing Sheets

US 10,313,127 B1

METHOD AND SYSTEM FOR DETECTING AND ALERTING USERS OF DEVICE FINGERPRINTING ATTEMPTS

CROSS REFERENCE TO RELATED APPLICATIONS

This application claims priority of U.S. Provisional Application Ser. No. 62/738,442, filed Sep. 28, 2018, the disclosure of which is incorporated herein by reference in its entirety.

FIELD OF THE INVENTION

The present invention relates generally to internet privacy, and in particular to the detection of methods used to capture parameters related to a user's computing device for purposes of creating a unique and trackable fingerprint, thereby a privacy threat warning system.

BACKGROUND OF THE INVENTION

Device fingerprinting refers to the process of collecting distinct parameters about a remote computing device over a communications network to form an identifier unique to the device. It is known that device fingerprinting may be used for fraud prevention, software licensing, and cybersecurity purposes. However, device fingerprinting has also gained widespread application by data analytics and advertising companies to uniquely identify and track the habits of individuals based on their computing devices. These practices raise serious privacy concerns.

For example, personally identifiable information (e.g., name, physical address, social security number) may be associated with a device fingerprint formed from parameters related to the active web browser and hardware configuration of a person's laptop. Subsequently the individual may be personally identified online based solely on the use of this laptop and web browser by a remote server with access to a database of these associations. During web-based communications, this may result in behavioral activities, such as websites viewed, hyperlinks clicked, and searches performed, being collected and stored without the person's knowledge or consent.

Methods known to the assignee of the present application and disclosed in U.S. Pat. No. 10,049,231, which is fully incorporated herein by reference in its entirety, may be used to thwart the ability of third parties to form an accurate device fingerprint of a computing device. However, there remains a need for technology that alerts of device fingerprint attempts for privacy threat protection and awareness purposes.

SUMMARY OF THE INVENTION

In some aspects, a detection method includes receiving information traversing a communications network. The method also includes identifying a subset of information among the received information based on a classification of that information. A dataset is then formed based on the subset of information. Next, the dataset is analyzed and the probability that parameters identified in the dataset are present for purposes of device fingerprinting is computed based on a weighted scoring system. Subsequently a score may be returned that reflects the probability the parameters are present for purposes of device fingerprinting.

In some aspects, a detection system includes a computer program running on a computing device that is configured to receive information traversing a communications network. The computer program identifies a subset of information among the received information based on a classification of that information. A dataset is then formed by the computer program based on the subset of information. Next, the computer program analyzes the dataset and computes the probability that parameters identified in the dataset are present for purposes of device fingerprinting based on a weighted scoring system. Subsequently the computer program may return a score that reflects the probability the parameters are present for purposes of device fingerprinting.

BRIEF DESCRIPTION OF THE DRAWINGS

The present inventive subject matter may be understood further by reference to the following description and accompanying drawings, in which like reference numerals represent similar parts throughout the drawings and wherein.

DETAILED DESCRIPTION

Figure 1:
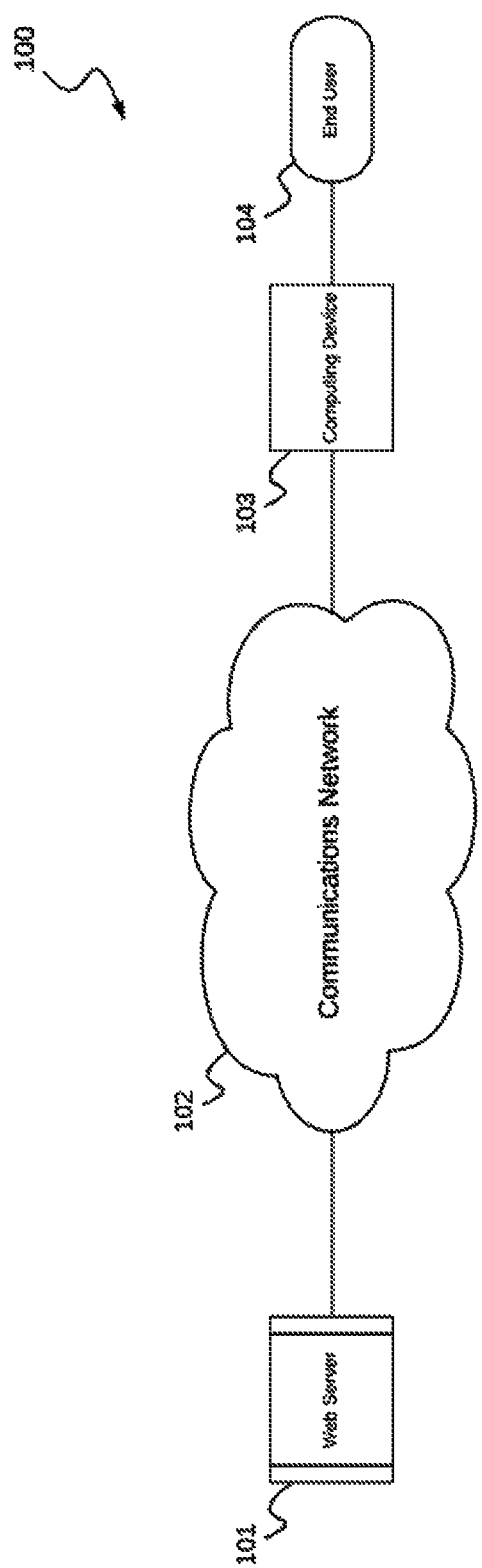
FIG. 1 is a schematic diagram of an exemplary communications network in which the present invention may be used.

FIG. 1 illustrates an exemplary communications network in which the present invention may be used. In this representation, a web server 101 communicates via a communications network 102 such as the Internet with a computing device 103 operated by an end user 104. In one embodiment, the computing device 103 may include one or more processors and computer readable storage on which a computer-based operating system functions, wherein the computer system may run any combination of computer programs thereon.

Figure 2:
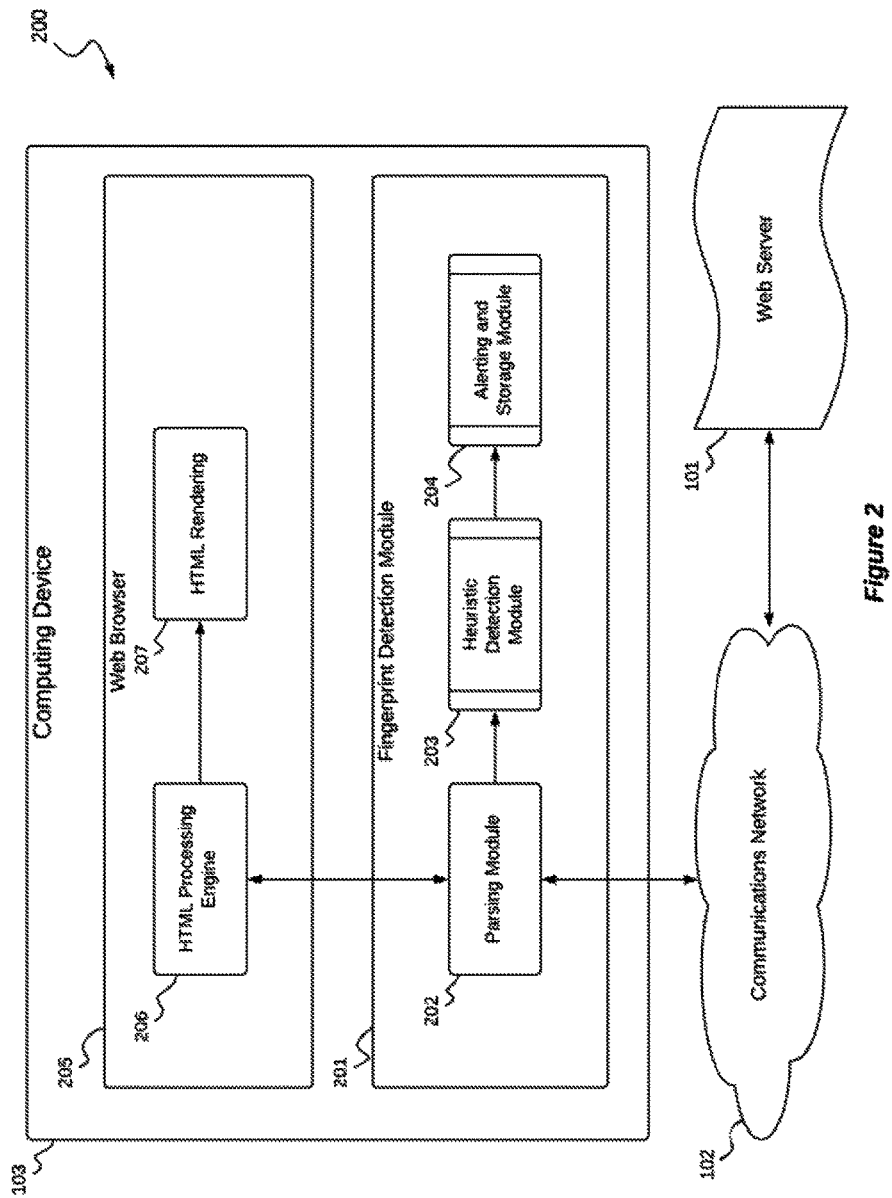
FIG. 2 is a flow chart showing an example of a computing device on which numerous modules are used to receive information from a communications network, parse the information into a readable format, and analyze the information with a heuristics detection module.

Referring to FIG. 2, a detection system 200 includes numerous modules implemented in a computer system and is designed to detect parameters used by third parties for purposes of device fingerprinting and tracking of the computing device 103 as described more fully herein. It is not necessary that all modules be present in a given embodiment, however for explanatory reasons it is helpful to understand how certain features may be combined to utilize the inventive subject matter.

The diagram in FIG. 2 shows how attempts to create a device fingerprint may be detected on a computing device 103 according to one embodiment of the inventive detection system 200. The computing device 103 in this example includes a fingerprint detection module 201, which in turn includes a parsing module 202, heuristic detection module 203 and alerting and storage module 204. The computing device 103 further includes a web browser 205 which may include an HTML processing engine 206 communicating with an HTML rendering engine 207. Operation of each module is described in more detail below. As used herein, the term "web browser" refers to any software application that operates on any form of computing device 103, including but not limited to a mobile computing device such as a smartphone, or a tablet computer, and that is capable of accessing resources on a network. Examples of such a web browser 205 include, but are not limited to, commercially available software applications such as Microsoft Internet Explorer, Google Chrome, Mozilla Firefox, and the Opera Browser. The web browser 205 may be one such computer program.

The parsing module 202 on the computing device 103 processes communications transmitted to and from a web server 101 via a communication network 102, such as the Internet in one embodiment. In another embodiment, the computing device 103 may communicate with a server or another computing device over a communications network 102 that is not the Internet.

Figure 3:
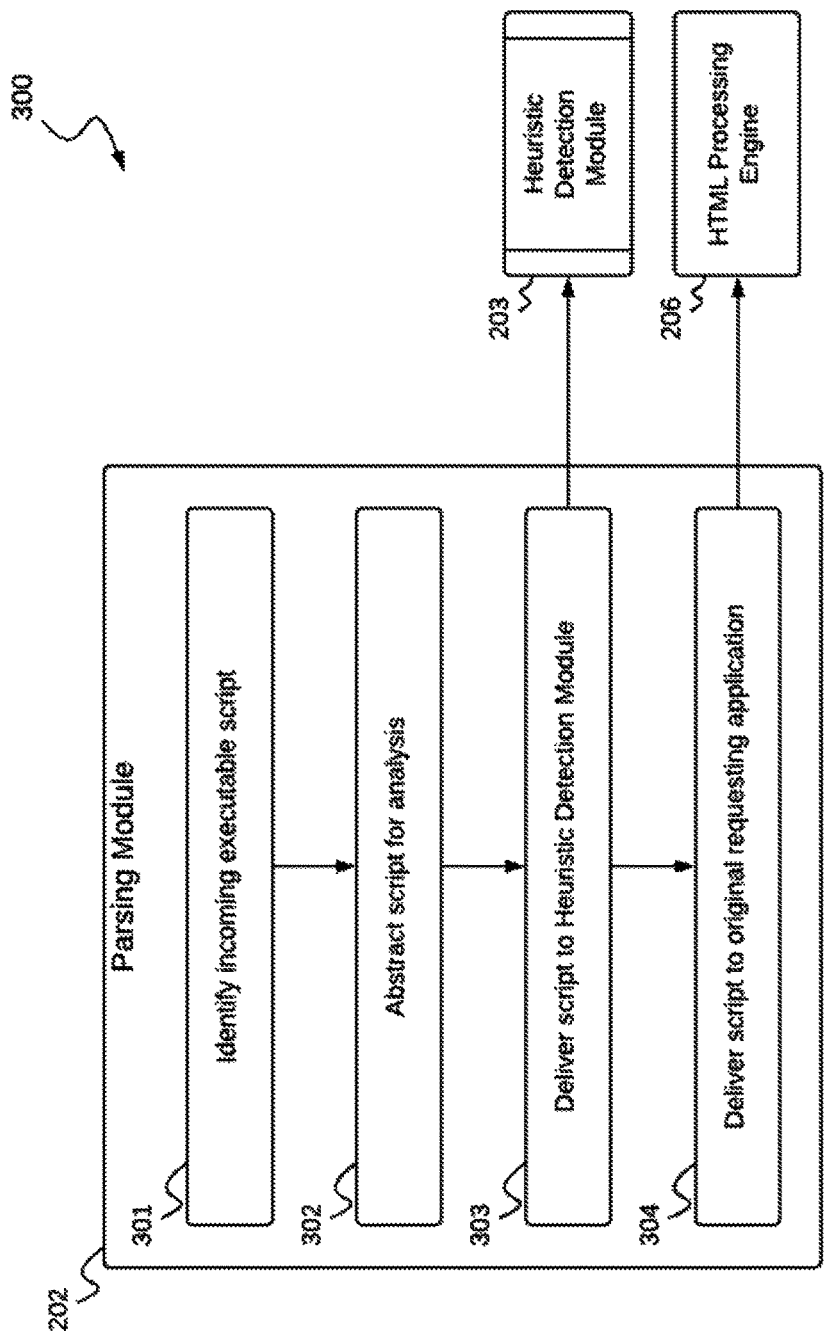
FIG. 3 is a block diagram illustrating the parsing module according to one embodiment used to identify a subset of information from a communications network based on identifiers showing that the information is an executable script, abstracting the script for analysis via delivery to the heuristic detection module, and then permitting the script's delivery to its intended destination.

FIG. 3 illustrates the parsing module 202, as follows:

Information is received by the parsing module 202 from a communications network 102. This may be accomplished, for example, by a computer program running on the computing device 103 that continuously filters incoming and outgoing TCP/IP communications traffic transmitted from or to the communications network 102. The parsing module 202 next identifies an executable script within the communications traffic in step 301 for abstraction, wherein the executable script is a subset of the data and information received by the parsing module 202 from the communications network 102. In some embodiments, identification of the executable script in step 301 for abstraction in step 302 may be based upon markers signifying the type of executable script, JavaScript, for example, may be identified based on header information or filetype (.js). Other predetermined identifiers may signify the beginning or end of an executable file in other embodiments. The parsing module 202 next generates a dataset for the abstracted script and passes or delivers the abstracted script, or dataset, to the heuristic detection module 203 for analysis in step 303. In the embodiment shown in FIG. 3, the last step 304 is for the parsing module to deliver the executable script in step 304 to its intended target software application, for instance, during a HTTP session, to the HTML processing engine 206 of the web browser 205.

Figure 4:
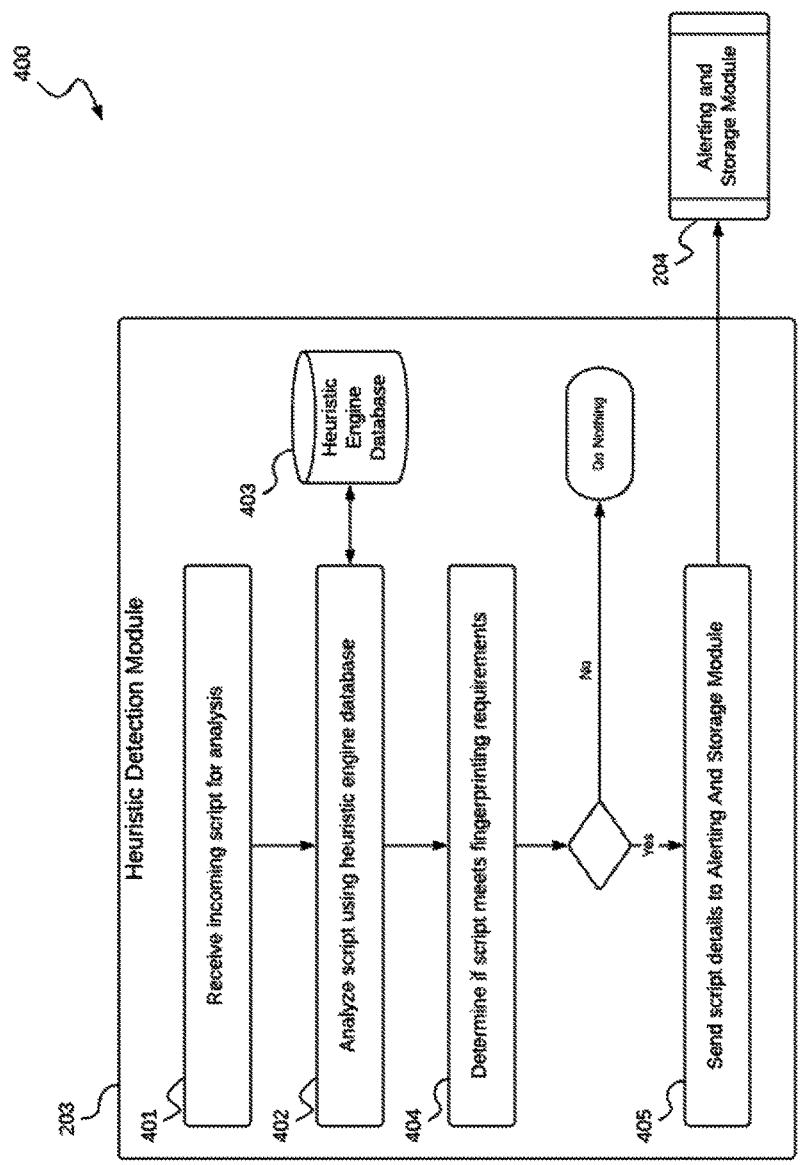
FIG. 4 is a block diagram showing one embodiment of the heuristic detection module wherein an abstracted script is received from the parsing module and analyzed in accordance with a weighted scoring system stored in a heuristic engine database. In the event that the script meets a threshold score based on the heuristics it is stored for future processing including potential alerts.

FIG. 4 shows the steps involved in one embodiment of the heuristic detection module 203. First the abstracted script 401 is received by the heuristic detection module 203 from the parsing module 202 for analysis. In some embodiments the abstracted script may be stored in a local storage medium for analysis. The abstracted script is then analyzed in step 402 using one or many heuristics methods stored in a heuristic engine database 403. According to one embodiment, the heuristic engine database 403 is queried and a list of parameters (or parameter request indicators) is returned and sorted in step 402 according to the inherent level of entropy, or randomness, possessed by each parameter, which allows determining of the probability that parameters contained in the dataset are present for purposes of collecting information used for purposes of device fingerprinting. In this context, parameters with higher degrees of entropy are important because of their statistical significance in a large dataset, which in turn increases the probability that, when combined with additional parameters, will create a fingerprint that is unique from any other computing device.

In this step 402, the abstracted script is then analyzed to determine if the parameters returned by the heuristic engine database 403 are present. For instance, in one embodiment if the abstracted executable script is based on JavaScript code, the heuristic detection module 203 may retrieve entropy-sorted parameters from the heuristic engine database 403. As an example, the following parameters may be retrieved from the heuristic engine database 403:

"fontlist",
"useragent",
"language",
"timezone",
"screenDepth",
"screenWidth".

The abstracted script is then analyzed in step 402 to determine if the above parameters are present according to a specific syntax and within a proximate space and the result would be stored and weighted according to a scoring system that accounts for each parameter's entropy level wherein a score may be generated and returned that reflects the probability the parameters present in the dataset are present for purposes of device fingerprinting. For example, the "fontlist" parameter is assigned a higher score than "screenDepth," because it possesses a higher degree of entropy. In another embodiment, the abstracted script is analyzed in step 402 to determine the treatment of parameters requested for collection using a paradigm retrieved from the heuristic engine database 403. An example in this embodiment may include determining whether the abstracted script contains computer program instructions that implement a hash function to create a hash value of parameters collected from the computing device 103. These examples of programmatic treatment are consistent with attempts by a third party to create a device fingerprint, because the hash value or concatenated string may form a device fingerprint serving as a unique identifier for the computing device 103. In another embodiment, computer instructions are detected to collect parameters and concatenate parameters known for use in device fingerprinting to form a string that may be returned, as these instructions are indicators that the parameters requested for collection may be used for device fingerprinting.

The abstracted script would be analyzed to determine in step 404 if these parameter instructions are present and the result would be stored and weighted according to a scoring system stored in the heuristic engine database 403. In another embodiment, the abstracted script is analyzed to determine whether the parameters or parameter requests present in the abstracted script are appropriate given the nature of the script's purpose. For example, in step 404 of this embodiment, it may be determined based on heuristics queried from the heuristic engine database 403 that the abstracted script's purpose is to facilitate the user's ability to enter a username and e-mail address into a form on a website, which might support a determination that the script does not meet fingerprinting requirements and the response would be to do nothing. Under this example, the abstracted script may be analyzed to determine if it includes parameters or parameter requests with characteristics consistent with those used to create a device fingerprint that are not relevant to the functioning of a form input script on a webpage, which might support a determination that the script does meet fingerprinting requirements. If such a determination is made, in step 405, script details are sent to the Alerting and Storage Module 204 which can alert the end user 104 and allow the computing device 103 to take appropriate action, and also store relevant details as to the third party attempt to develop a fingerprint of the computing device 103.

In some embodiments, the heuristic detection module 203 queries heuristics information in the heuristic engine database 403 which might be stored on a storage medium of a remote computing device rather than in a local storage medium. Additionally, in some embodiments, the results of the steps detailed herein are assigned varying weighted scores based on pre-set instructions stored in the heuristic engine database 403, then stored in local storage associated with the computing device 103 for future processing or alerting. In other embodiments, the results are transferred to a storage medium on a remote computing device. In some embodiments, the data contained within the heuristic engine database 403 can be hard coded into the heuristic detection module 203 itself, removing the need for the database.

Figure 5:
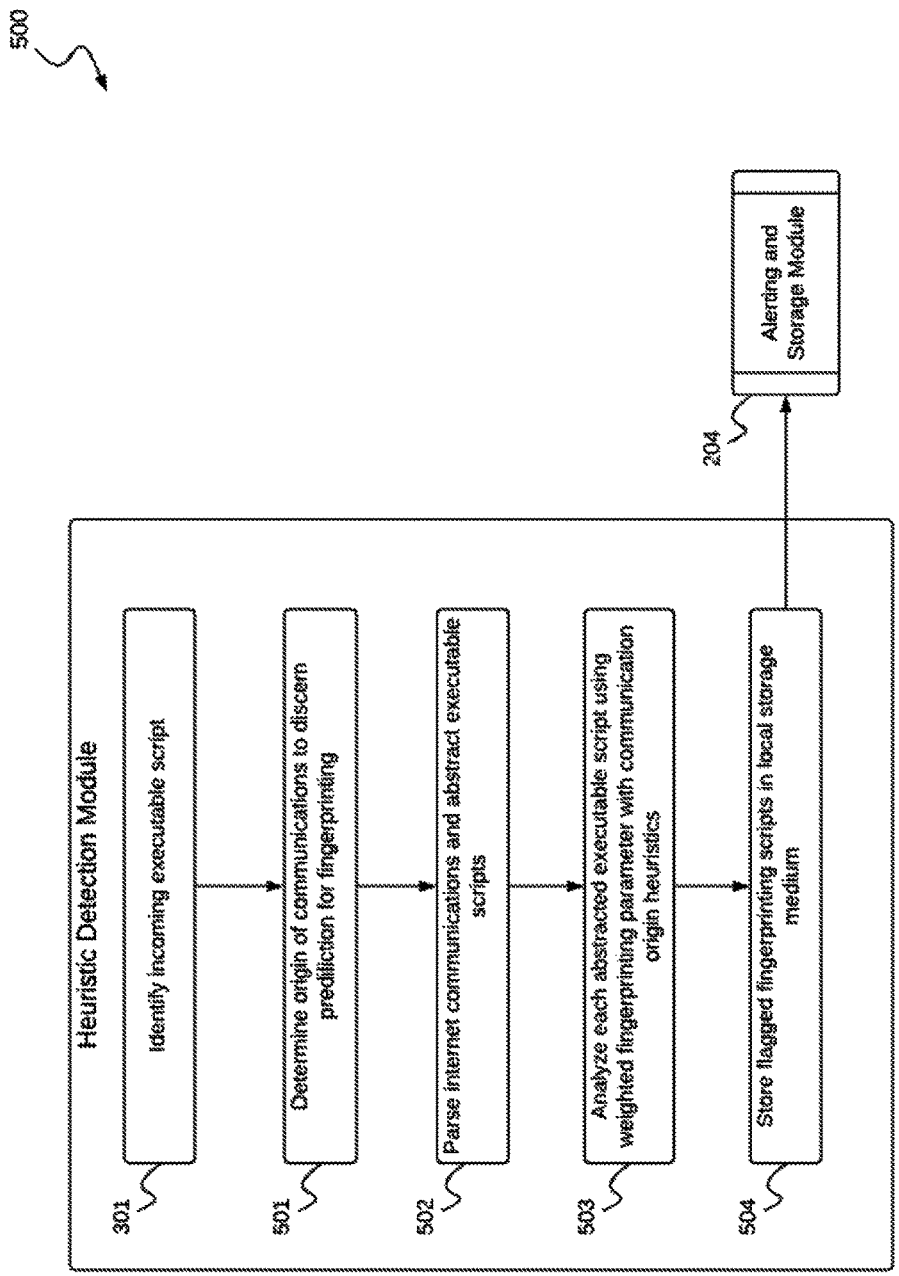
FIG. 5 is a block diagram illustrating one embodiment of the present invention wherein the originating node of a request for computer-readable parameters used for device fingerprinting is identified on a communications network.

In another embodiment, a primary heuristic used is the origin of the requests for parameters that may be used for device fingerprinting. FIG. 5 shows an example of the steps taken according to this embodiment. As the parsing module 202 receives information from the communications network 102, using a HTTP filter, for example, it identifies incoming network communications in step 301 and identifies the source (which may include the Internet. Protocol (IP) address and or hostname of the node) of the transmission in step 501 and discerns whether the source origin of the communications is recognizable based on its predilection for generating fingerprint requests. In one embodiment, this is accomplished by comparing the source node against a database in local storage 403 to determine whether the source is included on a list of known nodes used for sending parameter collection requests for purposes of device fingerprinting. Another embodiment includes the use of regular expressions to compare elements of the source node against a database of known nodes 403 to determine whether the source node is recognizable based on its predilection for generating fingerprint requests. For example, in one embodiment the subnetwork of an IP address may be compared against a list of known IP addresses. In another embodiment, regular expressions may be used to assess whether portions of the source node's hostname match with known nodes in a database 403. For example, the embodiment may identify source node abc123.com as a partial match with known node abc1234.com. This is important, because it is known that companies engaged in fingerprint-based tracking may slightly modify source node hostnames to avoid detection. Once a determination is made 501 about the origin of the communications, the procedure continues to step 502 wherein the communications are parsed and executable scripts abstracted to a dataset for analysis. Next, analysis 503 is performed using the heuristic detection module 203 to determine if parameters contained in the dataset are present for purposes of collecting information used for purposes of device fingerprinting, while also weighting the score 503 based on the whether or not the source node is a known fingerprinting source. The abstracted script may next be stored 504 in the alerting and storage module 204 if it is flagged as a fingerprinting script.

It will be evident to one skilled in the relevant art that each block of the illustrations, and combinations of blocks in the illustrations described above, may be implemented by computer program instructions on a computer system. These computer program instructions may be provided to a processor on various sorts of computer systems including a machine intended solely to be used as a browsing device, processors on mobile computing devices such as smartphones and tablets, or other programmable data processing hardware to produce a machine, such that the instructions, which execute via the processor of the computer or other programmable data processing hardware, allow for the implementation of the functions described in the drawings.

The description above is provided to enable any person skilled in the art to make and use the obfuscation system and/or method and explains the best modes of doing so as now contemplated by the inventors. However, various modifications to the disclosed subject matter will be apparent to any person skilled in the art. Such modifications are intended to fall within the spirit and scope of the inventive subject matter.

What is claimed:

1. A detection system for detecting attempts to collect parameters to create a device fingerprint, comprising:
   a computer program provided on a computing device having a processor and a non-transitory computer-readable medium and comprising one or more computer program instructions that when executed by said processor operate said detection system and cause the processor to perform a detection process, wherein said computer program of said detection system comprises:
   a fingerprint detection module defined by said computer program instructions, said fingerprint detection module receiving information traversing a communications network and performing the steps of:
   identifying a subset of said information based on a classification of the information transmitted and generating a dataset from the subset of information for analysis to identify parameters used for device fingerprinting;
   determining a probability that parameters contained in said dataset are present for collecting information used for device fingerprinting based on analysis using a weighted scoring system; and
   returning a score that reflects the probability the parameters present in the dataset are present for device fingerprinting, wherein the classification of information transmitted to generate a dataset is based on one of: the identification of an executable script based upon predetermined identifiers stored in a local storage medium; and the identification of an executable script based upon predetermined identifiers stored in a storage medium on a remote computing device.

2. The method of claim 1, wherein the classification of information transmitted to generate a dataset is based on the identification of an executable script using markers signifying the type of executable script.

3. The method of claim 1, wherein the weighted scoring system used to determine the probability that parameters contained in the dataset are present for device fingerprinting purposes relies on the entropy possessed by each parameter.

4. The method of claim 1, wherein the weighted scoring system used to determine the probability that parameters contained in the dataset are present for device fingerprinting purposes relies on the programmatic treatment of parameters requested.

5. The method of claim 1, wherein the weighted scoring system used to determine the probability that parameters contained in the dataset are present for device fingerprinting purposes relies on the relevance of the parameters in relation to the nature of the communications in which the parameters are identified.

6. The method of claim 1, wherein the weighted scoring system used to determine the probability that parameters contained in the dataset are present for device fingerprinting purposes relies on a determination that the source of the parameters is a known source of device fingerprinting attempts.

7. The method of claim 1, wherein the weighted scoring system is included in a database stored in a local storage medium.

8. The method of claim 1, wherein the weighted scoring system is included in a database stored in a stored medium on a remote computing device.

9. A detection system for detecting attempts to collect parameters to create a device fingerprint, comprising:
- a computer program provided on a computing device having a processor and a non-transitory computer-readable medium and comprising one or more computer program instructions that when executed by said processor operate said detection system and cause the processor to perform a detection process, said computer program of said detection system comprising:
- a fingerprint detection module defined by said computer program instructions, said fingerprint detection module receiving information traversing a communications network and performing the steps of:
- identifying a subset of said information based on a classification of the information transmitted and generating a dataset from the subset of information for analysis to identify parameters used for device fingerprinting;
- determining a probability that parameters contained in said dataset are present for collecting information used for device fingerprinting based on analysis using a weighted scoring system; and
- returning a score that reflects the probability the parameters present in the dataset are present for device fingerprinting, wherein the score returned reflecting the probability that the parameters present in the dataset are present for device fingerprinting is stored in one of a local storage medium and a storage medium located on a remote computing device.

10. A detection system provided on a computing device having a processor and a non-transitory computer-readable medium and comprising one or more instructions that when executed by said processor operate said detection system and cause the processor to perform a detection process, said detection system comprising:
- a fingerprint detection module operated by said processor which communicates with a communications network from which detection attempts are made, said fingerprint module receiving information traversing said communications network and performing the steps of:
- identifying a subset of said information based on a classification of transmitted information;
- generating a dataset from the subset of information for analysis to identify parameters used for device fingerprinting;
- determining the probability that parameters contained in said dataset are present for collecting information used for device fingerprinting based on analysis using a weighted scoring system; and
- returning a score that reflects the probability the parameters present in the dataset are present for device fingerprinting;
- wherein the weighted scoring system used to determine the probability that parameters contained in the dataset are present for device fingerprinting purposes relies on at least one of the entropy possessed by each parameter, the programmatic treatment of parameters requested, the relevance of the parameters in relation to the nature of the communications in which the parameters are identified, and a determination that the source of the parameters is a known source of device fingerprinting attempts.

11. The detection system of claim 10, wherein the instructions, when executed by the processor, classify the information transmitted to said fingerprint detection module generate said dataset based on the identification of an executable script using markers signifying the type of executable script.

12. A detection system provided on a computing device having a processor and a non-transitory computer-readable medium and comprising one or more instructions that when executed by said processor operate said detection system and cause the processor to perform a detection process, said detection system comprising:
- a fingerprint detection module operated by said processor which communicates with a communications network from which detection attempts are made, said fingerprint module receiving information traversing said communications network and performing the steps of:
- identifying a subset of said information based on a classification of transmitted information, wherein said fingerprint detection module includes a parsing module which receives said transmitted information and identifies said subset of said transmitted information;
- generating a dataset from the subset of information for analysis to identify parameters used for device fingerprinting;
- determining the probability that parameters contained in said dataset are present for collecting information used for device fingerprinting based on analysis using a weighted scoring system; and
- returning a score that reflects the probability the parameters present in the dataset are present for device fingerprinting.

13. The detection system of claim 12, wherein said fingerprint detection module further including a heuristic detection module, and said parsing module generates said dataset which communicates said dataset to said heuristic detection module.

14. The detection system of claim 13, wherein said heuristic detection module determines the probability that parameters contained in said dataset are present for collecting information used for device fingerprinting based on analysis using a weighted scoring system.

15. The detection system of claim 14, wherein said heuristic detection module returns said score that reflects the probability the parameters present in the dataset are present for device fingerprinting.

16. The detection system of claim 12, wherein the classification of information transmitted to generate a dataset is based on the identification of an executable script using markers signifying the type of executable script.

17. The detection system of claim 10, wherein the weighted scoring system is included in at least one of a database stored in a local storage medium or a remote computing device.

* * * * *